United States Patent [19]
Anderson

[11] Patent Number: 6,047,762
[45] Date of Patent: Apr. 11, 2000

[54] SHADE CONTROL FOR A VEHICLE WINDOW

[75] Inventor: Rick A. Anderson, Grand Haven, Mich.

[73] Assignee: Prince Corporation, Holland, Mich.

[21] Appl. No.: 09/045,530

[22] Filed: Mar. 20, 1998

[51] Int. Cl.[7] ..................................................... B60J 3/00
[52] U.S. Cl. ....................... 160/370.22; 160/265; 160/274
[58] Field of Search ................................. 160/370.22, 310, 160/270, 274, 265, 280, 287, 311, 37; 296/97.8, 97.4

[56] References Cited

U.S. PATENT DOCUMENTS

| | | |
|---|---|---|
| 1,217,261 | 2/1917 | Zorba . |
| 2,609,193 | 9/1952 | Foster . |
| 2,684,499 | 7/1954 | Lewis . |
| 2,732,594 | 1/1956 | Adams et al. . |
| 3,475,865 | 11/1969 | Arnes . |
| 4,758,041 | 7/1988 | Labeur ................................. 160/274 X |
| 4,898,224 | 2/1990 | Woodworth . |
| 5,067,541 | 11/1991 | Coslett . |
| 5,105,867 | 4/1992 | Coslett . |
| 5,113,922 | 5/1992 | Christensen et al. ............... 160/192 X |
| 5,119,592 | 6/1992 | Westfall et al. . |
| 5,170,830 | 12/1992 | Coslett . |
| 5,186,512 | 2/1993 | VandenBerge et al. . |
| 5,201,810 | 4/1993 | Ojima et al. .................... 160/370.22 X |
| 5,353,548 | 10/1994 | Westfall . |
| 5,404,926 | 4/1995 | Ojima et al. .................... 160/370.22 X |
| 5,463,793 | 11/1995 | Westfall . |
| 5,560,668 | 10/1996 | Li .................................... 160/370.22 X |
| 5,605,370 | 2/1997 | Ruiz . |

FOREIGN PATENT DOCUMENTS

| | | |
|---|---|---|
| 741755 | 12/1955 | United Kingdom . |
| 828358 | 2/1960 | United Kingdom . |

*Primary Examiner*—David M. Purol
*Attorney, Agent, or Firm*—Harness, Dickey & Pierce, P.L.C.

[57] ABSTRACT

A shade control assembly cooperates with one edge of a shade mounted to a rigid bar for urging the shade into an extended use position from a roller. The control includes constant tension coil springs on opposite sides of the cross member for uniformly controlling opposite edges of the shade in its motion. In a preferred embodiment of the invention, the springs are mounted within slotted guide channels and a guide member in each of the channels is slidably coupled to the cross member. In a preferred embodiment, the shade is retracted against the tension of the springs by a drive motor which rotates the roller thereby winding the shade upon itself for storage. In such embodiment to extend the shade, the motor is driven in a reverse direction, allowing the springs to unroll the free end of the shade from the roller, extending it for use.

29 Claims, 2 Drawing Sheets

SHADE CONTROL FOR A VEHICLE WINDOW

BACKGROUND OF THE INVENTION

The present invention relates to a vehicle window shade and particularly to a control mechanism facilitating movement of the shade between a retracted position and an extended use position.

Shades for vehicle windows are becoming increasingly popular, particularly in southern climates where the sun load on a vehicle can be significant and cause passenger discomfort even with air conditioned vehicles, such as automobiles. Conventional shade mechanisms typically employ a spring-loaded manual roller shade which can be extended with a handle and locks over a hook for holding the shade in an extended use position covering a window. Some vehicles include elaborate control arm mechanisms which allow for the electrical operation of a shade. One such vehicle is a BMW 740iL Series, which provides such a window shade for only the rear window. Typically, passenger side rear windows do not have sufficient room to accommodate such complicated arms and electrical control mechanism necessary to hold the shade in an extended use position and adequately retract the shade.

The use of flat coiled springs as a window sash counterbalance is well-known as, for example, disclosed in U.S. Pat. No. 2,609,193. The application of this type of spring to the shade environment has not been necessary in view of the fact that most window shade mechanisms include a coil spring contained within the roller itself which provides tension for retracting the shade to a stored position. The rachet locking mechanism for such shades, however, can easily become jammed and become somewhat frustrating for the user when such an event occurs. When the shade is mounted within the door of a vehicle, this problem is compounded since access to the roller mechanism is limited. Thus, there exists a need an improved shade control mechanism for vehicle windows and one which is reliable, easy to use and preferably which can be motorized at a minimal expense and installed in a relatively small space.

SUMMARY OF THE PRESENT INVENTION

The system of the present invention satisfies this need by providing a shade control assembly including a cross member extending along a leading edge of a flexible shade. The control assembly includes springs coupled on opposite sides of said cross member for uniformly controlling opposite edges of the shade and for urging the shade into an extended use position from a roller. In a preferred embodiment of the invention, the springs are mounted in guide channels with slides coupled to opposite ends of said cross member. In a preferred embodiment to extend the shade, a reversible drive motor is driven in a direction allowing the springs to move the bar, unrolling the leading edge of the shade from the roller and extending it for use. To retract the shade, the direction of the motor is reversed. With such structure, a relatively compact, reliable, and inexpensive motorized shade construction is provided for use in connection with windows, such as vehicle windows.

These and other features, objects and advantages of the present invention will become apparent upon reading the following description thereof together with reference to the accompanying drawings.

DETAILED DESCRIPTION OF THE PREFERRED EMBODIMENT

Figure 1:
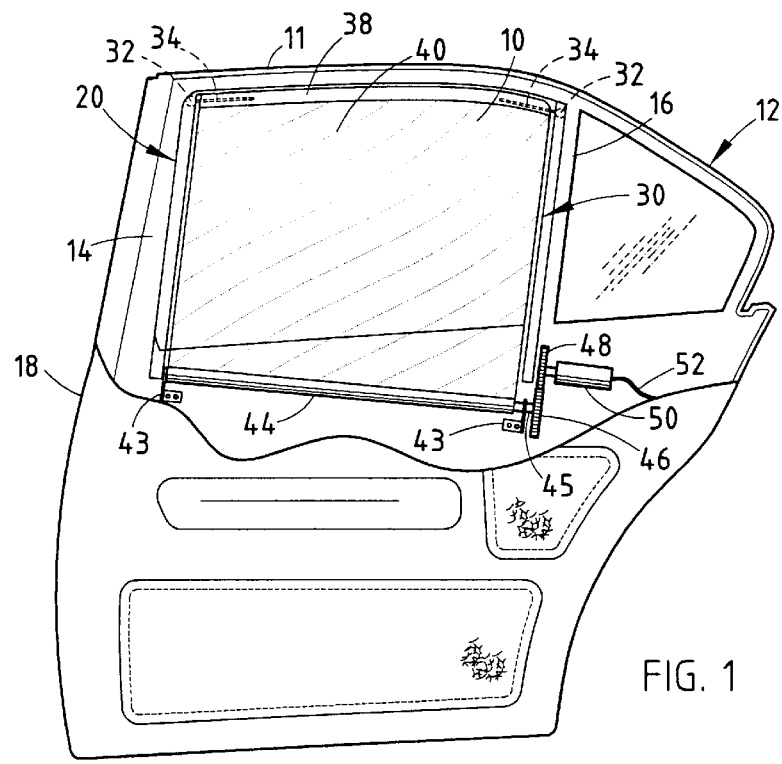
FIG. 1 is a fragmentary front elevational view of a passenger side rear door of a vehicle, cut away to expose the shade control mechanism of the present invention.
Figure 2:
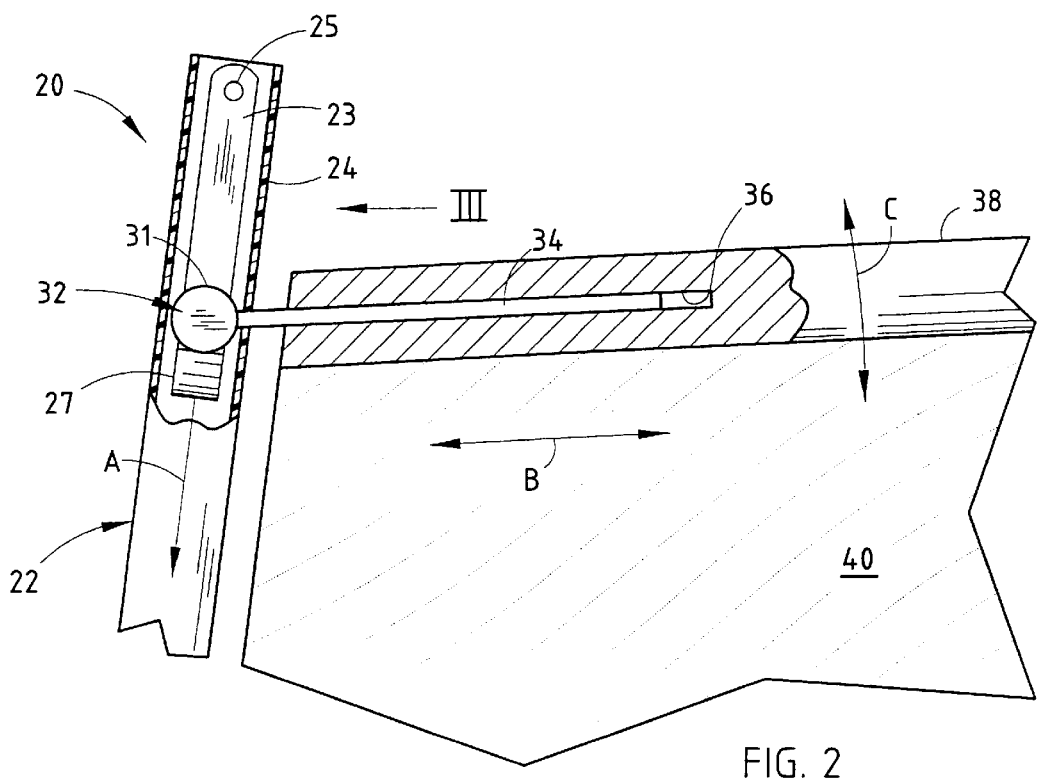
FIG. 2 is an enlarged fragmentary partly broken-away and partly cross-sectional view of one end of the structure shown in FIG. 1, shown with the shade partially retracted.
Figure 3:
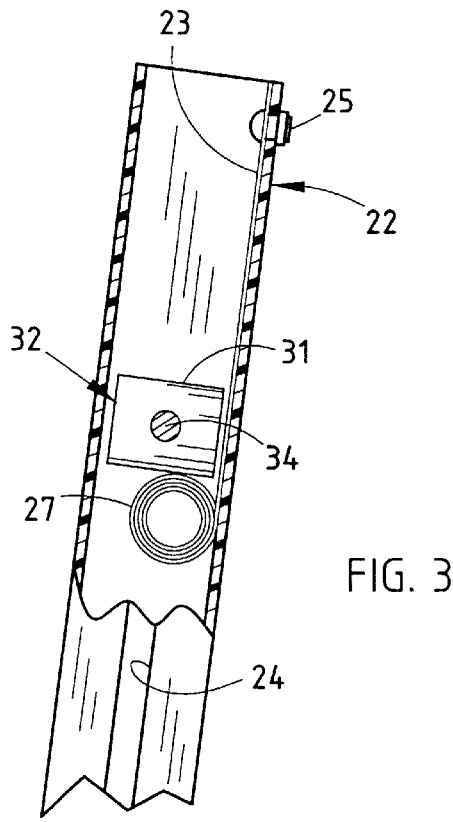
FIG. 3 is an enlarged fragmentary partly broken-away view of the one side of the control mechanism taken in the direction of arrow III in FIG. 2.
Figure 4:
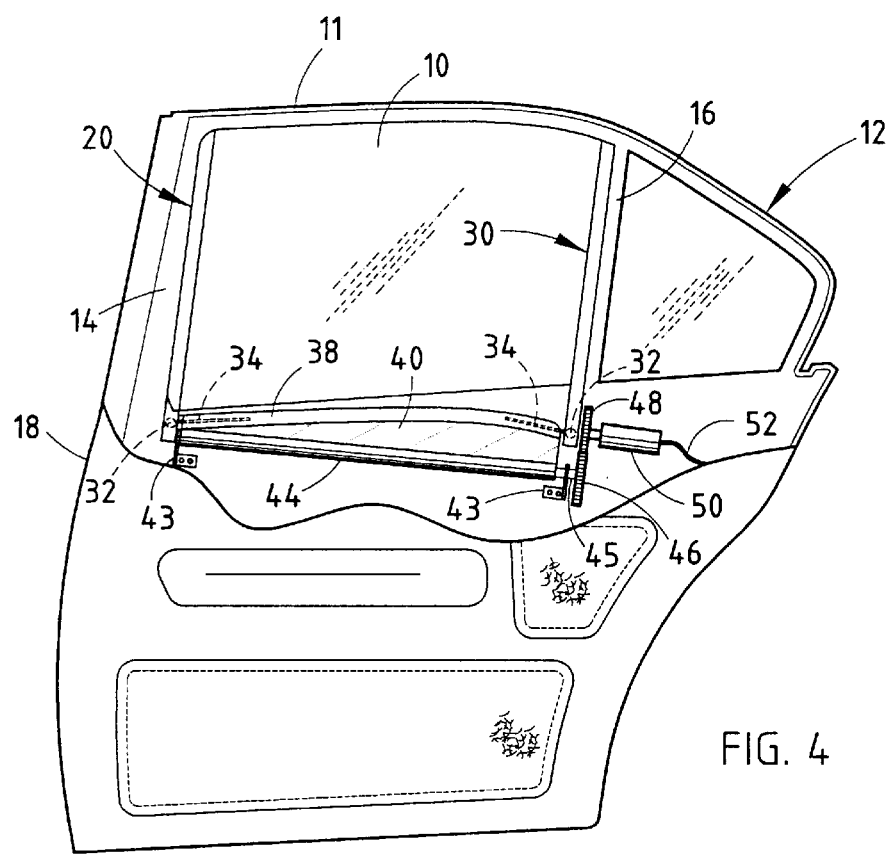
FIG. 4 is a front elevational view of the door panel shown in FIG. 1, shown with the shade in a fully retracted position.

Referring initially to FIGS. 1 and 4, there is shown a window 10, such as a window for a vehicle rear passenger side door 12, although the invention has applications to other types of windows in different environments. Window 10 includes a frame with a front vertically extending frame member 14 and a rear vertically extending member 16 to which guide and control members 20 and 30 of the present invention are mounted. In a preferred embodiment of the invention, members 20 and 30 each comprise generally square cross-sectional, extruded polymeric, tubular channels 22 (FIGS. 2 and 3), each having a slot 24 formed therein defining guide tracks. Channels 22 are mounted to frames 14 and 16 such that the slots 24 face one another when mounted to the door 12. Mounted within each of the channels 22 of control members 20 and 30 is a constant force spring 23 which can be of conventional construction and is anchored near the top of each of the members 20 and 30 by means of a fastener such as a rivet 25. The constant force springs are commercially available flat coiled springs. In the preferred embodiment, the channels 22 for guides 20 and 30 had an internal dimension of approximately one inch with the coil springs 23 having a width of approximately three-quarters of an inch to provide clearance, as shown in FIGS. 2 and 3, allowing the spring 23 to roll upon itself toward the mounting rivet 25. Thus, the springs 23 typically will have a coiled up section 27 above which there is positioned a slide 32 in the form of a solid cylindrical rod section having a rod-shaped stem 34 extending therefrom and into an elongated aperture 36 formed in each end of a cross member 38. A flexible shade 40 is attached to cross member 38 in a conventional manner.

The cross member 38 may be curved slightly, as seen in FIGS. 1 and 4, to conform to the top frame member 11 of the vehicle door where present or otherwise conform to the top of the vehicle roof near the intersection of the top of the window and the vehicle roof. Slides 32 are also dimensioned to fit and move freely within the square channels 22 with the stems 34 extending through slots 24, allowing the cross member 38 to move freely upwardly and downwardly with the shade attached thereto. The constant force springs 23 tend to extend the shade from its roller 44, mounted to the door frame 18 in a conventional manner utilizing suitable mounting brackets 43 (shown schematically in FIG. 4), allowing the roller 44 to rotate freely within the door frame. Coupled to the axle 45 of roller 44 is a gear 46 coupled to a drive gear 48 of a reversible motor 50. Motor 50 is actuated by a three-position double-pole polarity reversal switch (not shown) by means of conductors 52 to reverse the polarity of power applied to motor 50 from the vehicle's electrical system. The switch applies either no power to motor 50, thus, holding the shade in position or power of reversible voltage. Depending on the polarity, the roller 44 is rotated in a direction for winding the shade 40 thereon while at the same time the springs 23 unwind with section 27 moving downwardly in a direction indicated by arrow A in FIGS. 2 and 3 or in an opposite direction to allow the springs 23 to naturally coil upwardly in the direction opposite arrow A drawing the cross member 38 and shade 40 attached thereto upwardly to an extended position. By stopping the motor at any desired location, the shade can be positioned at any desired intermediate position, such as shown in FIG. 2, between the fully extended position shown in FIG. 1 and the fully retracted position shown in FIG. 4.

Shade 40 may be made of any desirable flexible material including a mylar film tinted as desired, fabric, perforated darkened fabric or any other suitable shade material which is generally commercially available. The shade is cut at its edge coupled cross member 38 to conform to the shape of the member and may be attached thereto utilizing conventional upholstery techniques, such as by stapling into the polymeric cross member 38, bonding it thereto by an adhesive or providing a longitudinal slot in the member into which an end of the fabric is attached utilizing a fastening bead. The apertures 36 at opposite ends of cross member 38 are sufficiently long to allow the stems 34 to slide in and out in the direction indicated by arrow B in FIG. 2 as necessary to accommodate the motion of the shade. By providing a cylindrical or rod-shaped slide 32, the slide also can tilt upwardly and downwardly in slot 24 as indicated by arrow C in FIG. 2 to also accommodate the motion of the shade as it is allowed to raise under the force of sections 27 of springs 23 tending to coil up against the cylindrical outer walls 31 of the slides 32. Thus, the cylindrical surface of coil sections 27 engage the cylindrical surfaces 31 of slides 32 on an orthogonal axis providing a point contact at the intersection of the two linear edges in engagement, thereby minimizing the friction between the coil springs 23 and slides 32. Slot 24 has a width sufficient to allow free movement of stem 34 therethrough. The channels 22 may be extruded of a suitable polymeric material such as polyvinyl chloride, ABS or the like, which is appropriate for the automotive environment, as can the cross member 38 and roller 44. Roller 44 is mounted to the vehicle door frame utilizing conventional bushings and right angle brackets 43 holding the axle of the shade roller in rotational relationship and alignment with the window 10 of the vehicle, such as that when extended as shown in FIG. 1, the shade 40 substantially covers the window 10.

Thus, with the system of the present invention, a window shade is drawn upwardly and evenly on opposite edges by a substantially rigid cross member by utilization of a pair of constant force springs, one mounted on each side of the window frame, and is urged upwardly from a roller to which the opposite end of the generally rectangular shade is mounted. The roller, in turn in the preferred embodiment of the invention, is motor driven to retract the shade against the constant force springs, winding it upon itself. With such a system, therefore, there is no need for manual operation of the shade nor hooking it at its top edge to hold it in an extended position. The motor, when deactivated through the gear coupling to the roller, holds the shade in a desired adjusted position. With this system, therefore, a relatively inexpensive, reliable and compact shade control mechanism is provided with uniformly controlled opposite edges of the shade as it is moved between retracted and extended positions. If desired, the rectangular shade can have a width sufficient to allow it to extend within the slots 24 of guides 20 and 30 to completely cover the window and add further stability to the edges of the shade.

It will become apparent to those skilled in the art that these and other modifications to the preferred embodiment of the invention as described herein can be made without departing from the spirit or scope of the invention as defined by the appended claims.

The invention claimed is:

1. An assembly comprising:
   a roller for mounting to a vehicle frame member adjacent a vehicle window;
   a substantially rigid cross member;
   a flexible shade having one edge mounted to said roller and an opposite edge mounted to said substantially rigid cross member;
   a pair of flat constant force springs for mounting adjacent opposite sides of a vehicle window, each of said flat constant force springs having a coiled section; and
   guides coupling said cross member to said constant force springs at a position generally above said coiled section of said flat constant force springs thereby urging said shade from said roller.

2. The assembly as defined in claim 1 wherein said guides include a pair of guide channels mounted to opposite sides of a window and including slots formed therein facing one another.

3. The assembly as defined in claim 2 wherein said guides further include a slide positioned in each of said guide channels above said coiled section of said flat constant force springs.

4. The assembly as defined in claim 3 wherein said guides additionally include a rod-shaped stem extending outwardly from each of said slides through said slots in said channels and wherein said cross member includes apertures formed in opposite ends for slidably receiving said stems.

5. The assembly as defined in claim 4 wherein said roller is coupled to a drive motor for rotating said roller for retracting said shade around said roller and allowing said shade to be withdrawn from said roller by said flat constant force springs.

6. The assembly as defined in claim 5 wherein said guide channels are made of an extruded polymeric material.

7. The assembly defined in claim 6 wherein said shade is made of a flexible film.

8. The assembly as defined in claim 7 wherein each of said slides is a solid rod having a length shorter than the internal dimension of said guide channel.

9. An assembly comprising:
   a pair of guide channels mounted to opposite sides of a window including slots formed therein facing one another, said guide channels being generally square in cross section;
   a constant force spring mounted within each of said guide channels;
   a slide positioned in each of said guide channels above a coiled section of said constant force springs;
   a rod-shaped stem extending outwardly from each of said slides through said slots in said channels;
   a cross member having an aperture formed in opposite ends for slidably receiving said stems; and
   a flexible shade having one end attached to said cross member for controlling the movement of said one end of said shade by said constant force springs.

10. The assembly as defined in claim 9 and further including a roller and wherein said shade has an opposite end, said opposite end coupled to said roller for retracting said shade against the force of said constant force springs.

11. The assembly as defined in claim 10 wherein said roller is coupled to a reversible drive motor for rotating said roller for retracting said shade around said roller and allowing said shade to be withdrawn from said roller by said constant force springs.

12. The assembly as defined in claim 11 wherein said guide channels are made of an extruded polymeric material.

13. The assembly as defined in claim 12 wherein said shade is made of a flexible film.

14. The assembly as defined in claim 13 wherein each of said slides is a solid rod having a length shorter than the internal dimension of said guide channel.

15. The assembly as defined in claim 9 wherein said slots in said guide channels extend substantially the length of said channels.

16. The assembly as defined in claim 15 wherein an end of said constant force springs is attached to a wall of said channels by fastening means.

17. The assembly as defined in claim 16 wherein said fastening means is a rivet.

18. An assembly comprising:
- a pair of guide channels mounted to opposite sides of a window, said channels each including an elongated slot formed in a wall of said channel facing a corresponding slot of the opposed channel;
- a spring mounted within each of said guide channels and having one end anchored to said channel;
- a slide positioned in each of said guide channels and coupled to an end of said spring opposite said one end, said slides having a cylindrical wall engaging said springs along orthogonal axes;
- a rod extending outwardly from each of said slides through said slot in said channel;
- a cross member having opposite ends coupled to said rods; and
- a flexible shade having one end attached to said cross member for controlling the movement of said one end of said shade by said constant force springs.

19. The assembly as defined in claim 18 wherein said cross member includes apertures formed in each end and said rods are slidably mounted within said apertures.

20. The assembly as defined in claim 18 wherein said springs comprise flat coil constant force springs.

21. The assembly as defined in claim 20 wherein said slides comprise a rod positioned in each of said guide channels adjacent a coiled section of said constant force springs.

22. The assembly as defined in claim 21 and further including a roller and wherein said shade has an opposite end, said opposite end coupled to said roller for retracting said shade against the force of said constant force springs.

23. The assembly as defined in claim 22 wherein said roller is coupled to a reversible drive motor for rotating said roller for retracting said shade around said roller and allowing said shade to be withdrawn from said roller by said constant force springs.

24. The assembly as defined in claim 23 wherein said guide channels are made of an extruded polymeric material.

25. The assembly as defined in claim 24 wherein said shade is made of a flexible film.

26. The assembly as defined in claim 25 wherein said guide channels are generally square in cross section.

27. The assembly as defined in claim 26 wherein said slots in said guide channels extend substantially the length of said channels.

28. The assembly as defined in claim 27 wherein an end of said constant force springs is attached to a wall of said channels by a rivet.

29. The assembly as defined in claim 18 wherein said springs are coiled constant force springs.

* * * * *